(12) United States Patent
Odell et al.

(10) Patent No.: US 7,755,324 B2
(45) Date of Patent: Jul. 13, 2010

(54) RECHARGING SYSTEM FOR WIRELESS INPUT DEVICES

(75) Inventors: Daniel L. Odell, Kirkland, WA (US); Daniel G. O'Neil, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 821 days.

(21) Appl. No.: 11/698,625

(22) Filed: Jan. 26, 2007

(65) Prior Publication Data

US 2008/0180060 A1 Jul. 31, 2008

(51) Int. Cl.
*H02J 7/00* (2006.01)
*G09G 5/00* (2006.01)

(52) U.S. Cl. ........................ 320/115; 345/168
(58) Field of Classification Search ............ 320/106, 320/107, 110, 111, 112, 113, 114, 115; 345/156, 345/168, 169; 361/600, 679.08, 679.11
See application file for complete search history.

(56) References Cited

U.S. PATENT DOCUMENTS

| | | | |
|---|---|---|---|
| 5,874,723 A * | 2/1999 | Hasegawa et al. | 235/472.01 |
| 6,375,344 B1 | 4/2002 | Hanson | |
| 6,476,795 B1 * | 11/2002 | Derocher et al. | 345/163 |
| 6,498,458 B1 * | 12/2002 | Chen | 320/114 |
| 6,935,797 B2 * | 8/2005 | Sim | 400/472 |
| 2002/0086703 A1 | 7/2002 | Dimenstein | |
| 2003/0025674 A1 * | 2/2003 | Watanabe | 345/168 |
| 2004/0183502 A1 | 9/2004 | Cheng | |
| 2005/0017675 A1 | 1/2005 | Hsieh | |
| 2005/0231485 A1 | 10/2005 | Jones | |
| 2006/0022948 A1 * | 2/2006 | Mori et al. | 345/168 |
| 2006/0072287 A1 | 4/2006 | Kwong | |

OTHER PUBLICATIONS

Microsoft Hardware Brings to Light First Rechargeable Wireless and Backlit Desktop, Publish Date: Sep. 13, 2006.
Logitech diNovo Edge Rechargeable Bluetooth Keyboard—Retrieved Date: Feb. 22, 2010.

* cited by examiner

*Primary Examiner*—Edward Tso
*Assistant Examiner*—M'Baye Diao
(74) *Attorney, Agent, or Firm*—Joseph R. Kelly; Westman, Champlin & Kelly, P.A.

(57) ABSTRACT

A charging device for charging a rechargeable power store is discussed. The charging device includes a housing having a top surface and a bottom surface. The charging device has a ledge extending from the top surface. The charging device also includes a power source and a pair of charging terminals positioned under the ledge and connected to the power source. The charging device is configured to engage terminals on a wireless input device.

20 Claims, 13 Drawing Sheets

RECHARGING SYSTEM FOR WIRELESS INPUT DEVICES

BACKGROUND

Computing systems such as personal computers, handheld or laptop devices, multi-processor systems, set top boxes, network PCs, mini computers, and the like typically receive input from a user via a device such as a keyboard and/or a mouse. Typically, these types of input devices are attached to a processing unit of such computer systems by wired connection. Signals generated by operations such as pressing an actuable switch on a keyboard are provided via the wired connection so that the computing device can process the inputs provided by a user.

One of the limitations of input devices that have a wired connection to a processing device is that the position of the input device is limited by the length of a cable that runs from a keyboard to the processing device to provide the wired connection. Because of this limitation, a user of a computing system may not be able to position a keyboard or other input device in a location that is comfortable for use by the computer user.

Wireless keyboards and other wireless input devices such as wireless mice have been developed to overcome this limitation. Wireless keyboards include an internal power supply that provides power to input handling circuitry. The input handling circuitry recognizes actuation of keys on the wireless keyboard and translates those actuations into a signal that can be transmitted to a receiver located in or attached to the computing device. Various wireless communication protocols can be used to transmit signals including, for example, radio frequency signals that communicate information to the computing device.

The internal power supply located within the wireless keyboard has a finite amount of energy stored therein. Because the wireless keyboard is unconnected to any type of external device under normal operation, normal usage of the wireless keyboard will dissipate the energy stored within the power supply. As the number of features and indicators on a keyboard increases, the power usage of the keyboard increases, causing power to be dissipated from the internal power supply at a faster rate. Eventually, it may be necessary to replenish or recharge the power supply in order for a user to continue to use the wireless keyboard.

The discussion above is merely provided for general background information and is not intended to be used as an aid in determining the scope of the claimed subject matter.

SUMMARY

In one embodiment, a charging device for charging a rechargeable power store is discussed. The charging device includes a housing having a top surface and a bottom surface with a ledge extending from one of the top and the bottom surface. The charging device further includes a power source located within the housing. A first pair of charging terminals is positioned on the ledge. The charging terminals are connected to the power source and are configured to engage terminals on a wireless input device.

In other embodiment, a combination of a wireless keyboard with a rechargeable power store and a charging element is discussed. The keyboard has a first surface and an opposing second surface. A pair of terminals is at a location on the first surface. The charging element configured to rest on a supporting surface and includes a housing having a main portion and a ledge that is cantilevered from the main portion between a first side and a second side of the housing. The ledge has top and bottom surfaces. The charging element has a power source positioned within the housing. A pair of terminals is positioned along a bottom surface of the ledge and is coupled to the power source. The distance between the bottom surface of the ledge and the support surface is about the same as a distance between the first surface and the second surface at the location of the terminals on the keyboard. The keyboard is configured to be positioned under the ledge so that the pair of terminals on the keyboard is in contact with the pair of terminals on the charging element.

In yet another embodiment, a method of charging a wireless input device is discussed. The method includes a step of providing a charging element having a first pair of exposed terminals adjacent a front edge of the charging element on a generally flat support surface. A wireless input device having exposed terminals is positioned on the generally flat support surface. The wireless input device is moved toward the charging element along the generally flat support surface until the exposed terminals on the front edge of the charging element are engaged with the exposed terminals on the wireless input device. The method further includes supplying an electric current to the wireless input device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
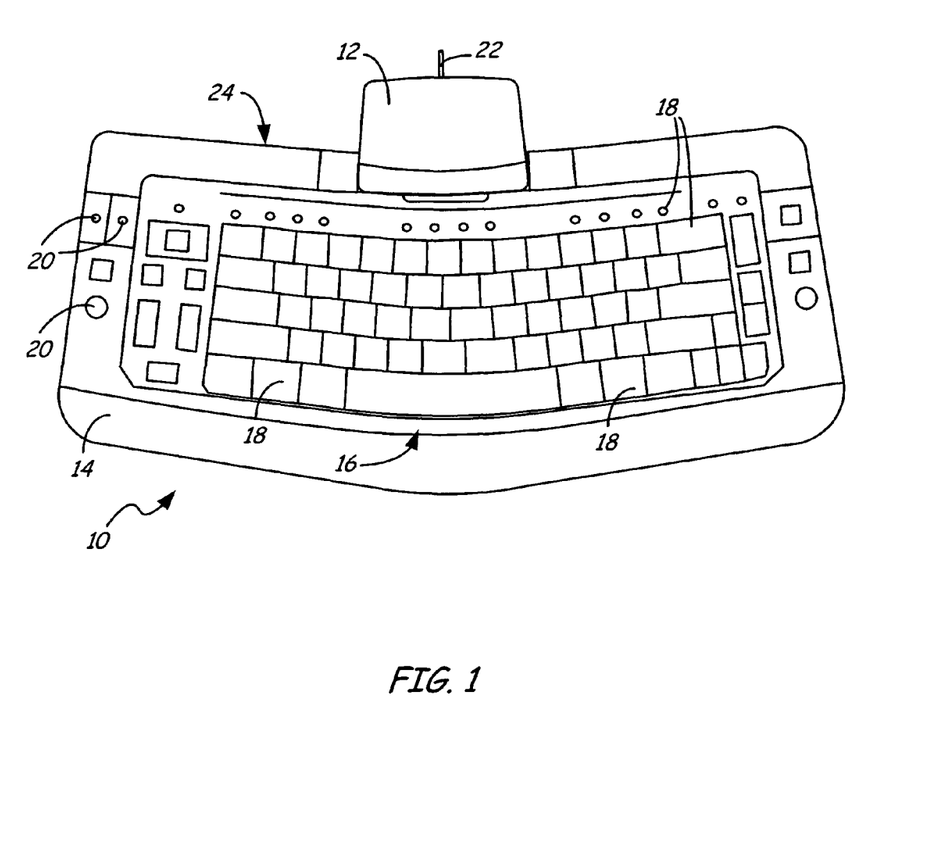
FIG. 1 is a plan view of a wireless keyboard connected to a charging element according to one illustrative embodiment.

FIG. 1 illustrates a wireless keyboard 10 attached to a charging element 12 in accordance with one illustrative embodiment. Wireless keyboard 10 includes a housing 14, which houses a keying area 16. Keying area 16 includes a plurality of actuable keys 18 arranged, for example, in a QWERTY layout, although the actuable keys 18 may be arranged in any order, including variations of the QWERTY layout. The keying area 16 also illustratively includes a number of lighted indicators 20, which are provided to alert a user of various conditions related to use of the keyboard. For example, a "Caps Lock" indicator indicates whether a so-called caps lock feature has been activated on the wireless keyboard 10. Numerous other indicators can be provided on the wireless keyboard as well. In one illustrative embodiment, the keys 18 are illuminated by a backlight (not shown in FIG. 1). The backlight can be provided by light source transmitted beneath one or more of the keys 18 via a light pipe arrangement, via fiber optics, or by employing any other suitable technique.

The wireless keyboard 10 illustratively includes a power supply located within the housing 14. The power supply provides electrical power for internal circuitry to perform such functions as recognizing the actuation of keys 18, controlling lighted indicators 20 including indicator 21, which provides information relative to the charge level of the power supply, and transmitting information from the wireless keyboard 10 to a remote device (not shown in FIG. 1). The power supply and internal circuitry located in the wireless keyboard 10 will be discussed in more detail below. As the power supply has a finite amount of energy stored within it, the wireless keyboard 10 may, from time-to-time, need to be recharged.

Charging element 12 is attached to the wireless keyboard along a front edge 24 of the frame 14 of wireless keyboard 10. The charging element 12 includes a power source (not shown in FIG. 1) that receives power from an external source via a power cable 22. The operation of the charging element 12 will be discussed in more detail below. While the charging element 12 is attached to the wireless keyboard 10, the electrical current flows from the charging element 12 to the power supply located within the wireless keyboard 10 to charge the power supply.

Figure 2:
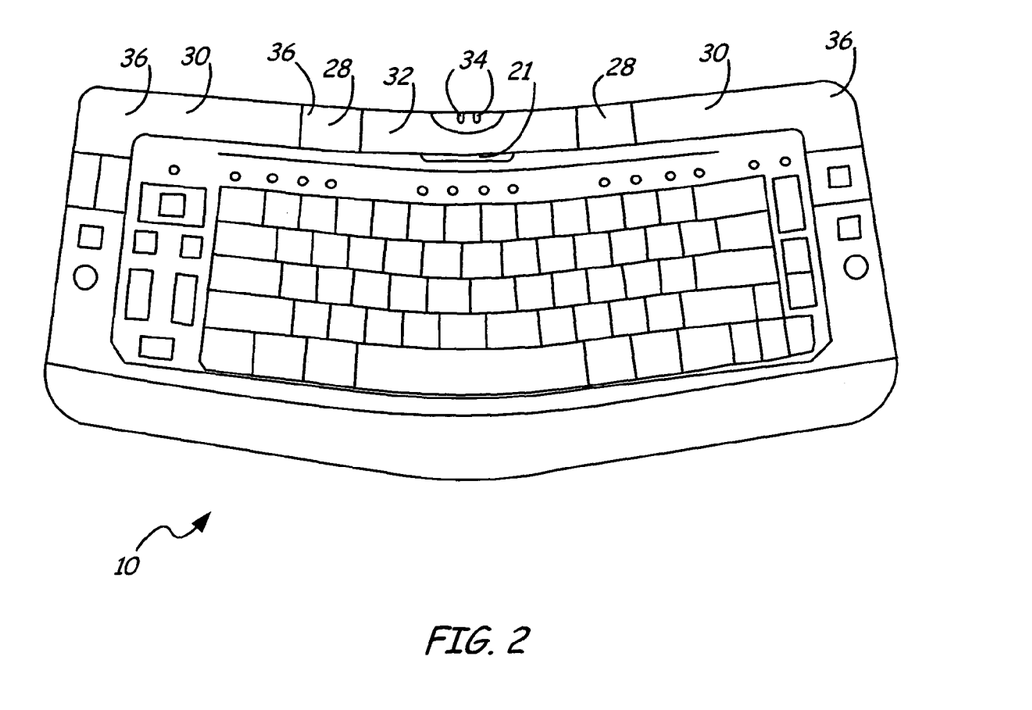
FIG. 2 is a plan view of the wireless keyboard of FIG. 1 unconnected to the charting element.
Figure 3:
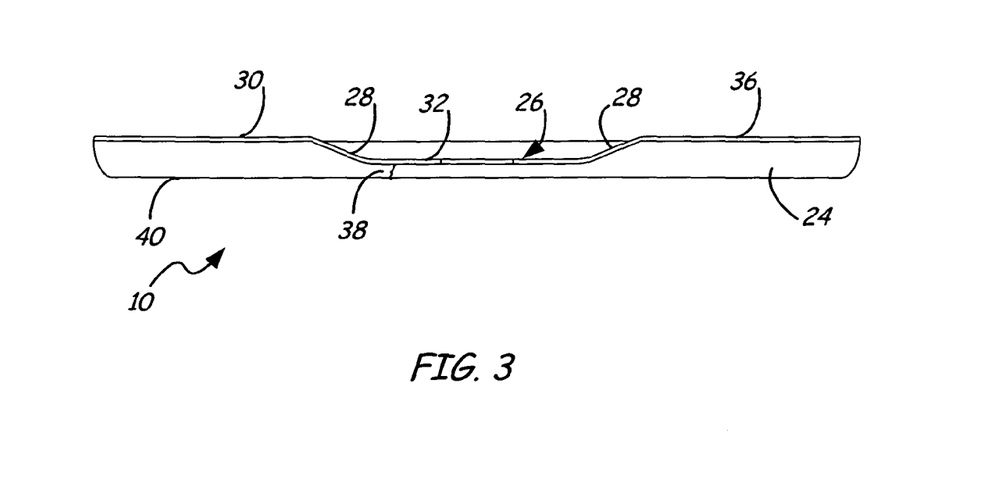
FIG. 3 is a side elevation view of a front of the wireless keyboard of FIG. 2.

FIGS. 2-3 illustrate the wireless keyboard 10 disconnected from the charging element 12. The wireless keyboard 10 has a front edge 24. A layer of material 36 illustratively extends over a portion of the top surface 30 that is adjacent to the front edge 24 of the wireless keyboard 10. In one illustrative embodiment, the layer of material 36 is a non-ferrous material such as aluminum. Alternatively, other materials may be used. The front edge 24 of the wireless keyboard 10 also illustratively includes a depression 26 formed into it. The depression 26 has a taper 28 on either side of the depression that moves away from a top surface 30 of the wireless keyboard 10. The depression 26 also includes a relatively flat base portion 32 positioned between the tapers 28. The base portion 32 has a height 38, which is defined as the distance between a bottom surface 40 and the base surface 42. A pair of terminals 34 are exposed on the base portion 32. The depression 26 has a width that conforms to a width of a ledge (62 in FIG. 4) of the charging element 12 when the charging element 12 and the wireless keyboard 10 are connected to each other as is shown in FIG. 1.

Figure 4:
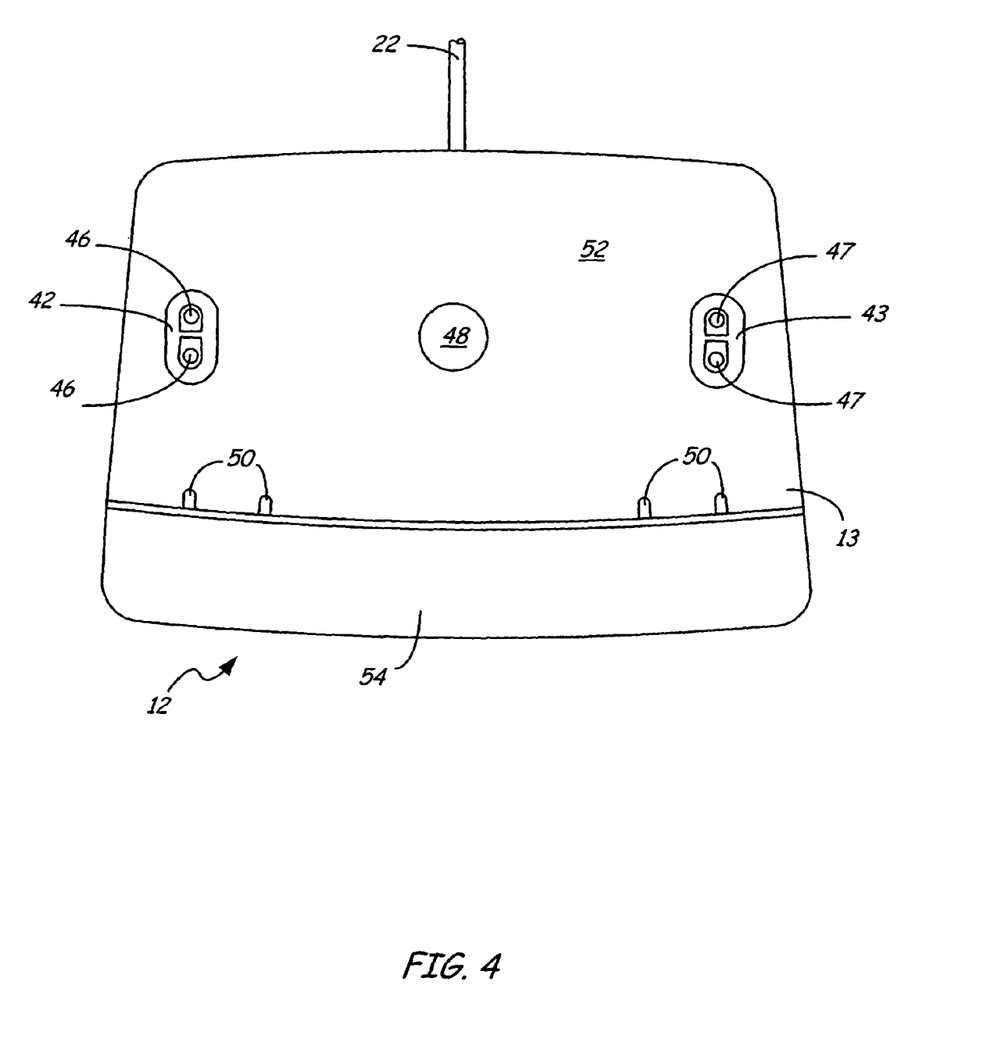
FIG. 4 is a plan view of the charging element of FIG. 1.
Figure 5:
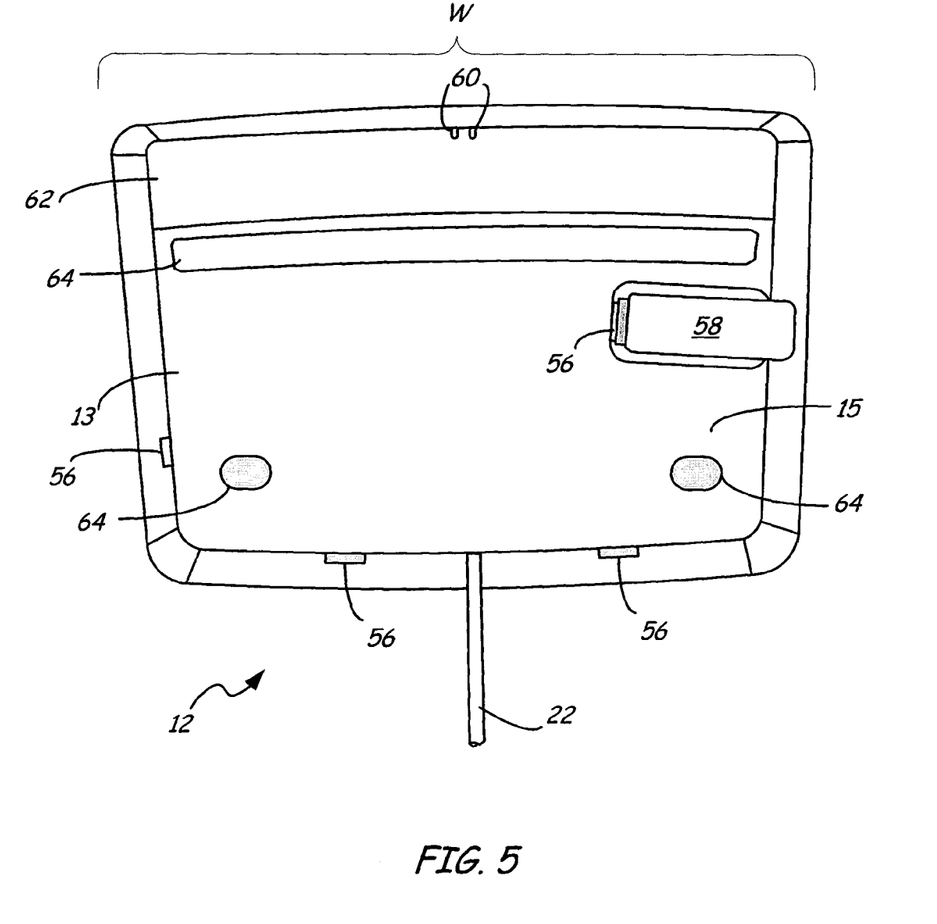
FIG. 5 is an illustration of the charging element showing a surface opposing the surface shown in FIG. 4.
Figure 6:
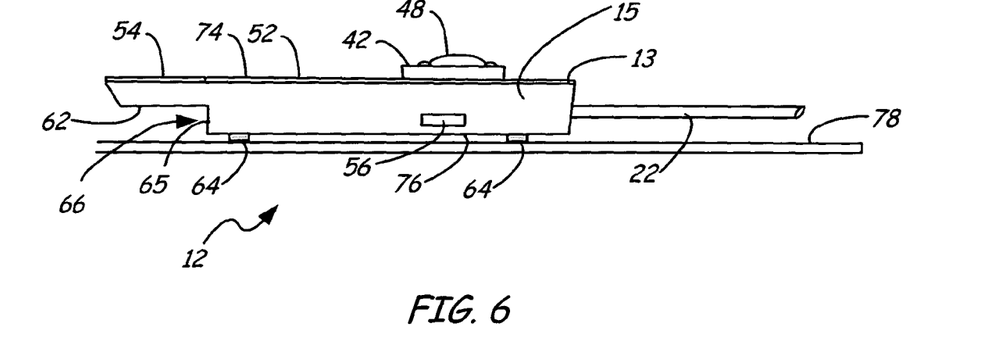
FIG. 6 is a side elevation view of the charging element of FIG. 4.

FIGS. 4-6 illustrate the charging element 12 in more detail according to one illustrative embodiment. The charging element 12 includes a housing 13 with a top surface 74 and an opposing bottom surface 76. A plurality of pads 64 are attached to the housing 13 along the bottom surface 76. The pads 64 are illustratively made of a soft durometer rubber and provide a material that engages a generally flat support surface 78. The pads 64 engage the support surface 78 to minimize slippage between the charging element 12 and the supporting surface 78. In addition, the pads 64 illustratively dampen noise that would otherwise occur when the charging element would slip as it is being engaged by the wireless keyboard 10.

The housing 13 of charging element 12 has a ledge 62 that illustratively extends along one end of the top surface 74. The ledge 62 is cantilevered from a surface 65 of the main portion 15 of the housing 13 so that the portion of the bottom surface 76 that extends along the ledge 62 is raised above the support surface 78 at a height 66. The height 66 is approximately the same as the height 38 of the base portion 32 of the depression 26. In addition, as described above, the width W of the charging element 12 is about the same as the width of the base portion 32 of the wireless keyboard 10. Thus, when the charging element 12 is positioned adjacent to the front edge 24 of the wireless keyboard 10, the depression 26 is capable of fitting under the ledge 62.

The housing 13 also illustratively includes a finished surface 54 that extends over the ledge 62 portion of the charging element 12 along the top surface 74. The finished surface 54 is illustratively made of the same material as the layer of material 36 on the top surface 30 of the wireless keyboard. Thus, the combination of the finished surface 54 and the top surface 30 illustratively provide a visual cue to align the charging element 12 with the wireless keyboard 10 for the purposes of connecting the wireless keyboard 10 with the charging element 12.

A pair of terminals 60 are located along the ledge 62 on the bottom surface 76 of the housing 13. The terminals 60 are in electrical communication with a power source located within the housing 13, as will be discussed below. The terminals 60 are illustratively positioned so that when the charging element 12 is positioned adjacent the wireless keyboard 10 so that the ledge 62 extends over the depression 26, the terminals 60 are in contact with the terminals 34 on the wireless keyboard 10.

The power cable 22 provides power to internal circuitry located within the housing 13. The power cable 12 illustratively includes conductors that provide a signal from an external power supply. In addition, the power cable 22 can include conductors that, for example, carry communication signals to and from the charging element 12 as will be seen below.

The charging element 12, in one illustrative embodiment, includes one or more ports 56 to which various devices can be connected. The ports 56 are illustratively universal serial bus (USB) ports, and the charging element 12 illustratively provides a USB connection to a computing device via, for example, conductors in the power cable 22. The charging element 12 also illustratively includes a plurality of lighted indicators 50, each of which provides status information related to a device that may be attached to one of the USB ports 56. Alternatively, other connections can be made between the computing device and the USB ports besides via the power cable 22. Alternatively still, charging element 12 need not include USB ports 56.

One example of a device that may be connected to one of the USB ports 56 is dongle 58. In one illustrative embodiment, the dongle 58 includes a radio receiver that is configured to send and/or receive wirelessly transmitted messages to and/or from the wireless keyboard 10. The dongle 58 can then provide information to the computing device via the USB port 56. Alternatively, the dongle 58 can be attached directly to the computing device and need not be connected to the charging element 12.

In addition, the charging element 12 illustratively includes a charging platform 52 that is capable of receiving a second wireless device and providing an electrical charge to that device. Charging platform 52 includes a pair of terminal pads 42 and 43, each of which has a pair of terminals 46 and 47, respectively. In one embodiment, the pairs 46 and 47 are in electrical communication with each other. In addition, the charging platform 52 includes a feature such as a dimple 48, which can be employed as a locating member to position a wireless device such as a mouse on the charging platform 52. It should be appreciated that the charging element 12 is illustratively capable of providing an electrical charge to the wireless keyboard 10 and the second wireless device simultaneously.

Figure 7A:
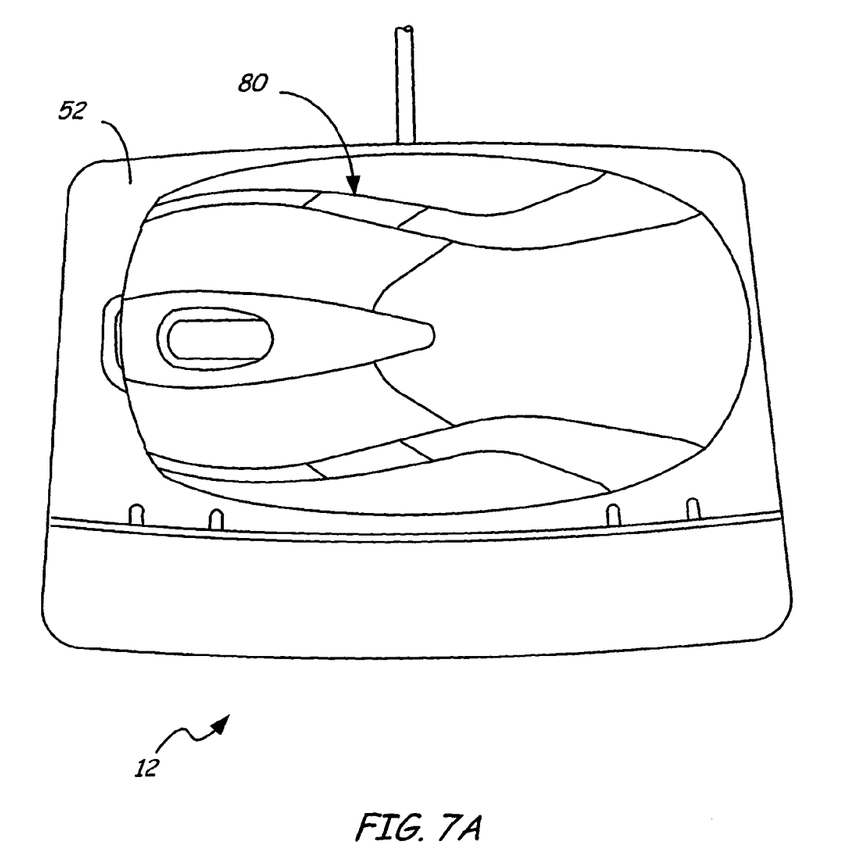
FIG. 7A illustrates a mouse positioned on the charging element according to one illustrative embodiment.
Figure 7B:
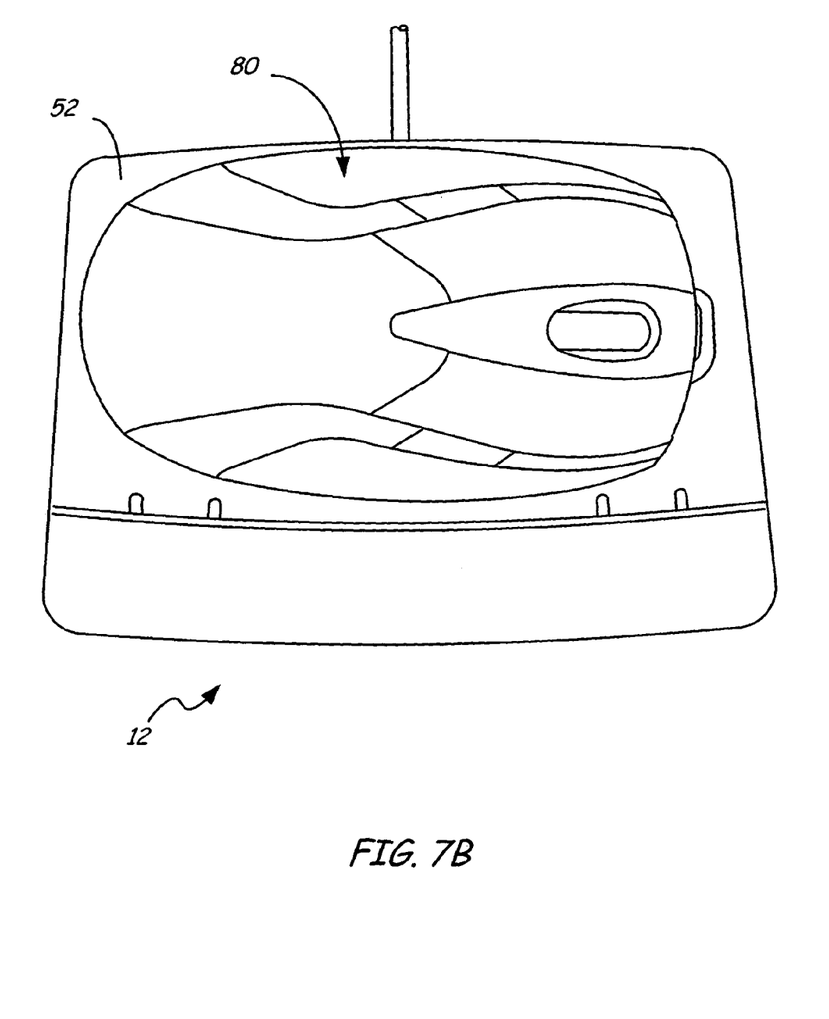
FIG. 7B illustrates a mouse positioned on the charging element according to one illustrative embodiment.
Figure 7C:
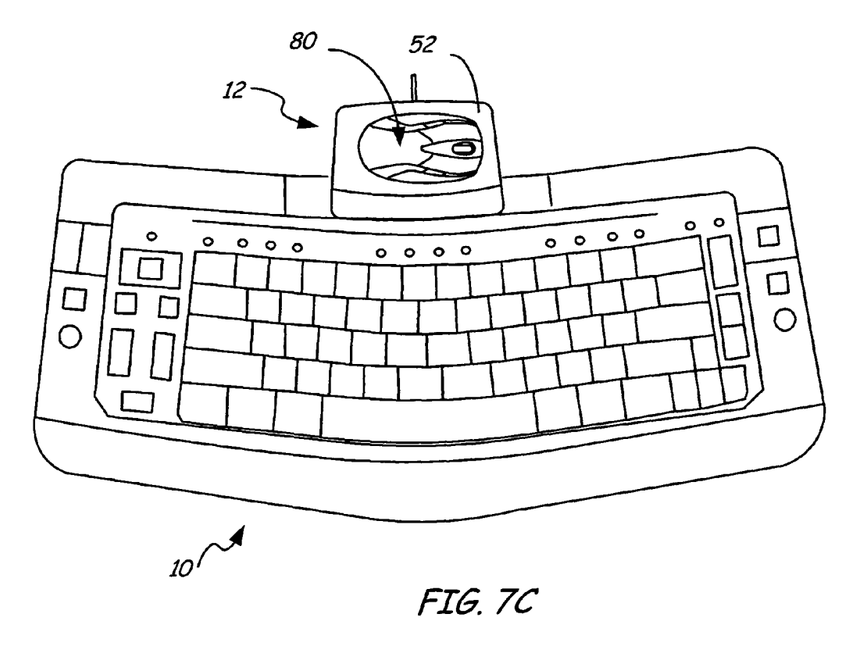
FIG. 7C is an illustration of the charging element of FIG. 1 simultaneously connected to the wireless keyboard and supporting a mouse positioned on the charging element according to one illustrative embodiment.

FIGS. 7A-7C illustrate a mouse 80 mounted onto a charging platform 54 of the charging element 12. In FIG. 7A, the mouse 80 is mounted on the charging platform 54 so that one set of the terminals 46 and 47 engages terminals located on a bottom of the mouse 80. In FIG. 7B, the mouse 80 is mounted on the charging platform 54 so that the other set of terminals 47 engages terminals located on the bottom of the mouse 80. In FIG. 7C, the mouse 80 is mounted on the charging platform 54 while the keyboard 10 is simultaneously engaged with the charging element 12.

The dimple 48 engages a cavity (not shown) on the bottom of mouse 80 to provide retention for the mouse 80 on the on the charging platform 54. Alternatively, the charging platform 52 can have a depression that can receive a protrusion on the mouse 80 to provide retention for the mouse 80. The mouse 80 can thus advantageously remain engaged with the charging element 12 even if, for example, the mouse 80 was slightly jostled. In addition, the dimple 48 provides for alignment to properly position the mouse 80 relative to one of the sets of terminals 46 and 47. By providing two sets of terminals 46 and 47, the mouse 80 can be conveniently mounted on the charging element 12 by users who employ either left and or right hand operation of the mouse 80.

Figure 8:
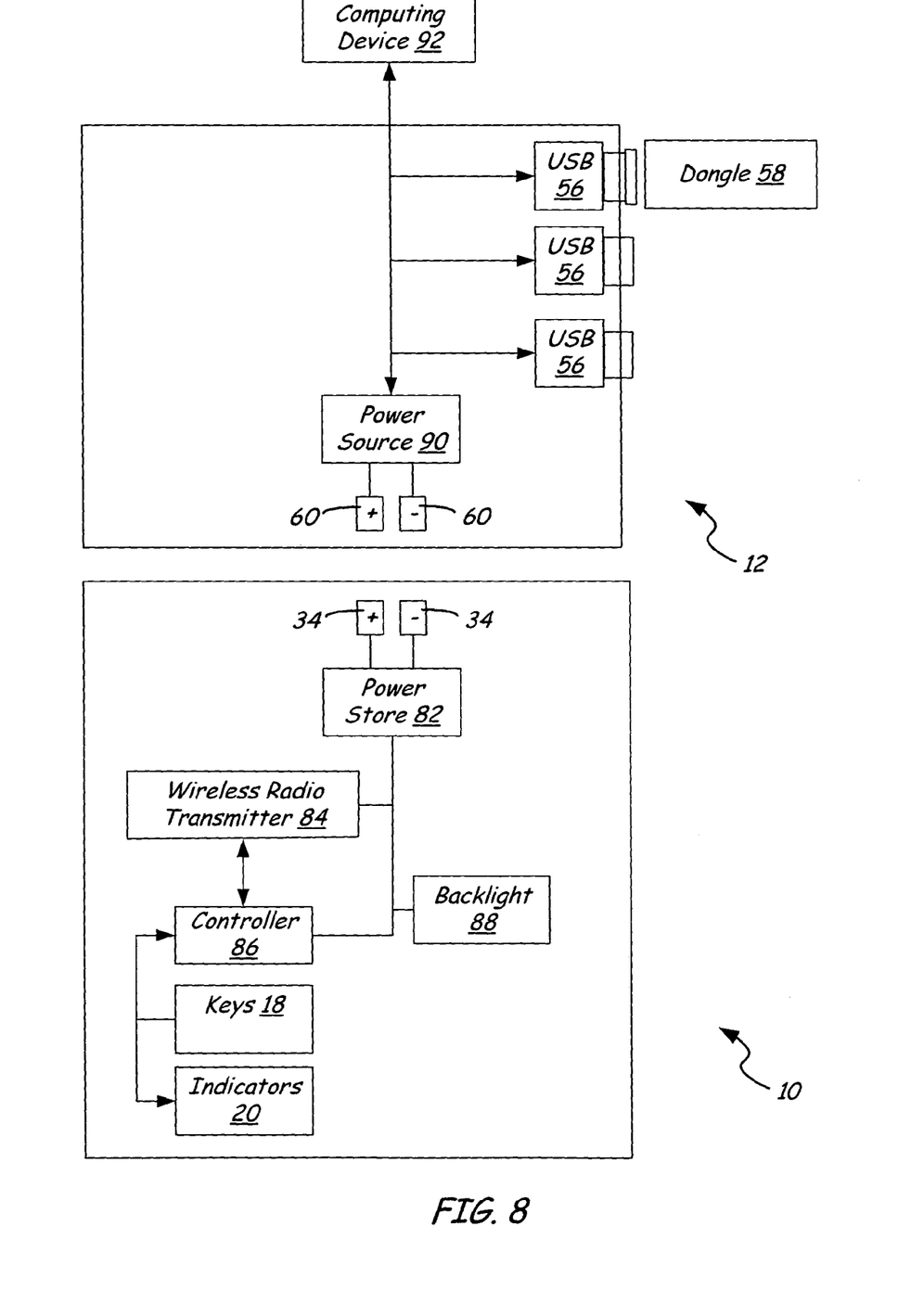
FIG. 8 is a block diagram illustrating circuit contained within the wireless keyboard and charging element of FIG. 1.

FIG. 8 illustrates some of the internal circuitry and operation of the wireless keyboard 10 and the charging element 12 in more detail. Wireless keyboard 10 includes a power store 82, which, in one embodiment, is a rechargeable battery. The power store 82 illustratively provides electrical power to a number of components including a controller 86, a wireless radio transmitter 84, and a backlight 88, which illustratively illuminates the keys 18 on the wireless keyboard 10. The controller 86 illustratively receives input signals that are indicative of actuation of any of the keys 18 and provides output signals to lighted indicators 20. In addition, the controller provides signals to the wireless radio transmitter 84 for transmission to a remote device.

Wireless keyboards 10, as described above, has two terminals 34 that are exposed for the purposes of receiving a charging signal to recharge power store 82. The terminals 34 include a positive terminal and a negative terminal, designated by a "+" and a "−", respectively. Charging element 12 likewise has a pair of terminals 60, one of which is positive and the other of which is negative. The terminals 60 are in electrical communication with power source 90. Power source 90 illustratively receives a power signal from a remote-computing device 92 via power cable 22 (shown in FIG. 1), although it can receive the power signal from any acceptable device. Thus, when terminals 60 are in contact with terminals 34 on keyboard 10, an electrical current can be provided to the keyboard 10 from the power source 90 through the terminals 60. The remote-computing device 92 also illustratively provides and/or receives signals from a plurality of USB ports 56. As discussed above, one of the USB ports 56 may be connected to a wireless radio receiver or dongle 58.

Figure 9:
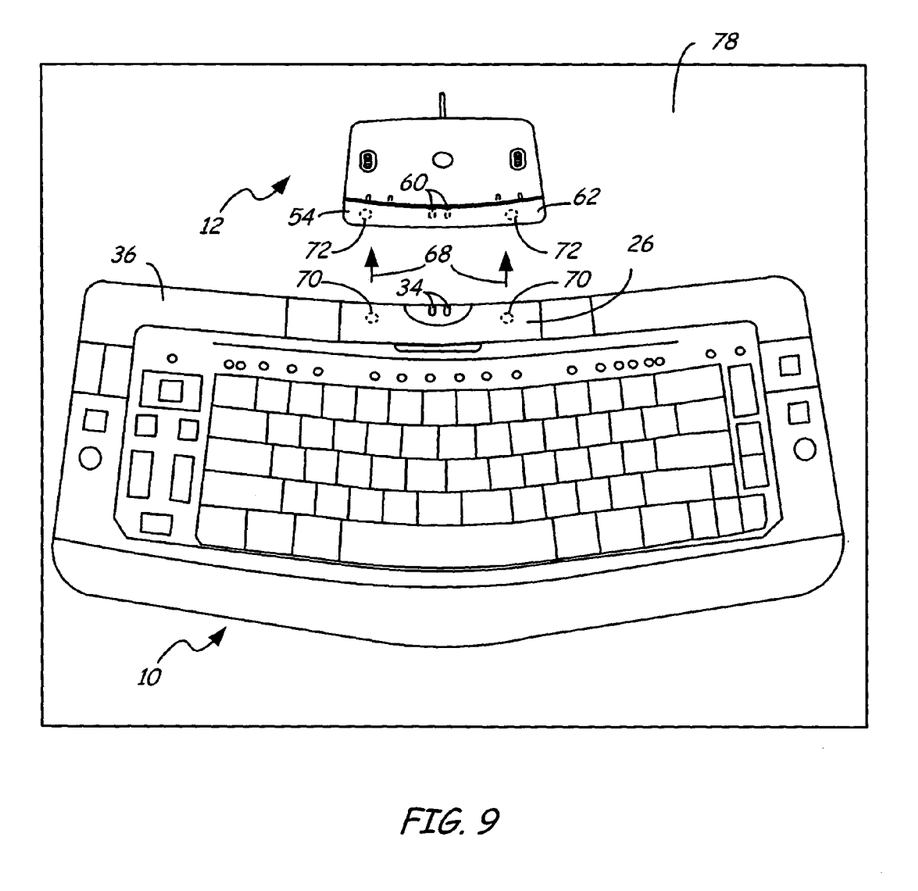
FIG. 9 illustrates an alignment of the wireless keyboard and charging element prior to connection of the wireless keyboard and charging element.
Figure 10:
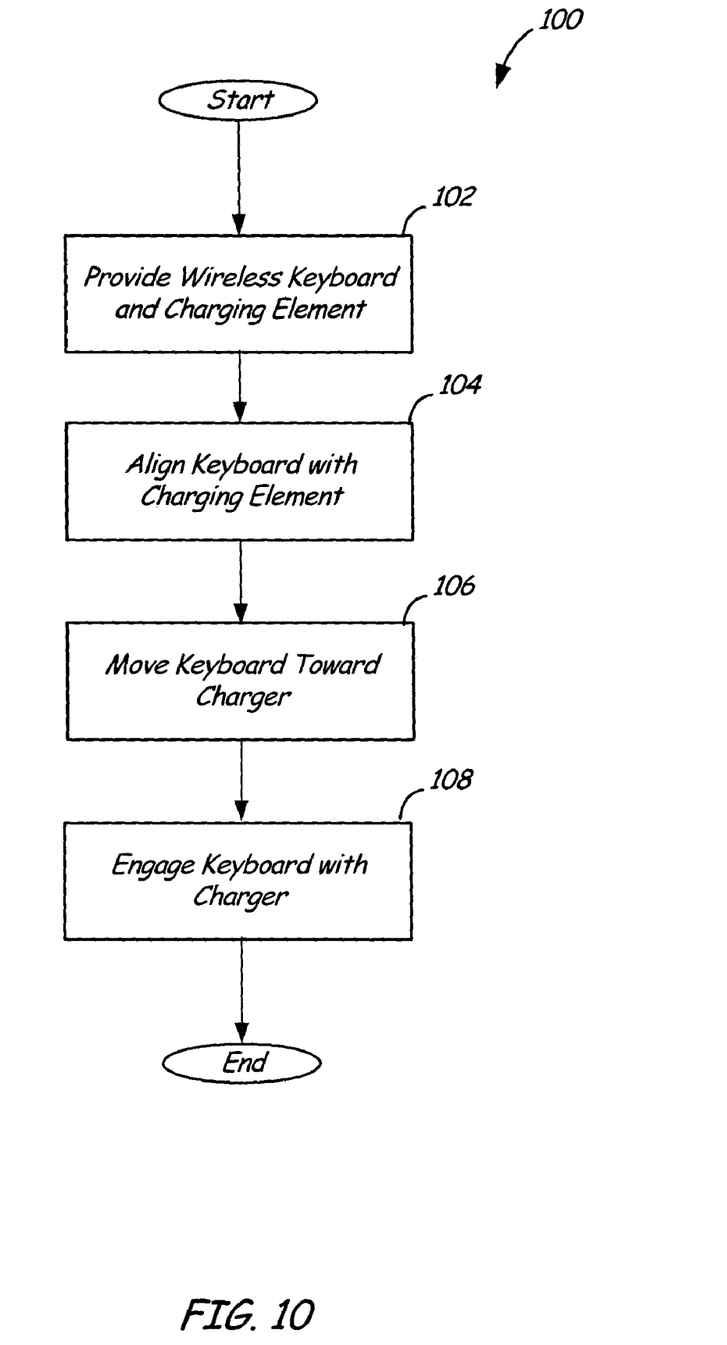
FIG. 10 is a flowchart detailing a method of charging a wireless keyboard according to one illustrative embodiment.

FIGS. 9 and 10 illustrate a method 100 of engaging wireless keyboard 10 with charging element 12 according to one illustrative embodiment. According to block 102, the wireless keyboard 10 and charging element 12 are provided on the generally flat support surface 78. The keyboard 10 is then aligned with the charging element 12. This is indicated by block 104. As discussed above, the shape of the depression 26, which is approximately the same width as the charging element 12 and illustratively, the similarity of the finished surface 54 and the top surface 36 provide visual cues to assist the user in the alignment process.

Once the wireless keyboard 10 and the charging element 12 are aligned, the wireless keyboard 10 is moved towards the charger 12 along the generally flat support surface 78 in the direction indicated by arrows 68. The movement of the wireless keyboard 10 in direction 68 is also along a plane that is illustratively parallel to the support surface 78, that is, the wireless keyboard 10 is illustratively slid as opposed to being lifted. This is represented by block 106. When the wireless keyboard 10 is moved until the depression 26 is located underneath the finished surface 54, the charging element 12 is engaged with the wireless keyboard 10, as is indicated by block 108. The surface 65 (shown in FIG. 4) illustratively provides a stop for the keyboard 10 to assist in the alignment of the keyboard 10 when it is slid into position with respect to the charging element 12.

In one illustrative embodiment, the step of engaging the wireless keyboard 10 with the charging element 12 includes providing a positive engagement between the wireless keyboard 10 and the charging element 12. FIG. 7 illustrates a pair of magnets 70 embedded in the depression 26 of the wireless keyboard 10. In addition a pair of magnets 72 are illustratively embedded in the ledge 62. The magnets 70 and 72 are aligned so that when the wireless keyboard 10 is positioned under the ledge 62, the magnets 70 and 72 are attracted to each other. In one illustrative embodiment, the magnets 72 embedded in the charging element 12 are spaced further apart than the magnets 70 such as for example about two millimeters further apart, although other spacing can be employed. Alternatively, the magnets 70 can be spaced further apart than the magnets 72. Thus, when the depression 26 is positioned under the ledge 62, the slight misalignment of the magnets tends to draw the keyboard 10 and the charging element 12 into more precise alignment.

Figure 11:
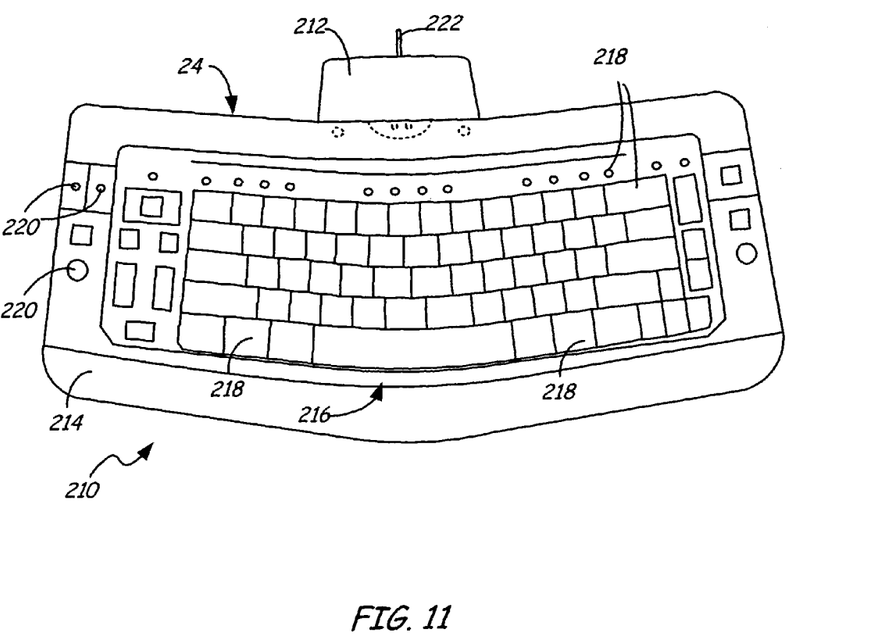
FIG. 11 is a plan view of a wireless keyboard connected to a charging element according to another illustrative embodiment.

FIG. 1 illustrates a wireless keyboard 210 attached to a charging element 212 in accordance with another illustrative embodiment. Wireless keyboard 210 has a housing 214, which includes a power supply located therein that provides power for the various functions performed by the wireless keyboard 210. The charging element 212 is attached to the wireless keyboard 210 along a front edge 224 of wireless keyboard 210. While the charging element 212 is attached to the wireless keyboard 210, the electrical current flows from the charging element 212 to the power supply located within the wireless keyboard 210 to charge the power supply.

Figure 12:
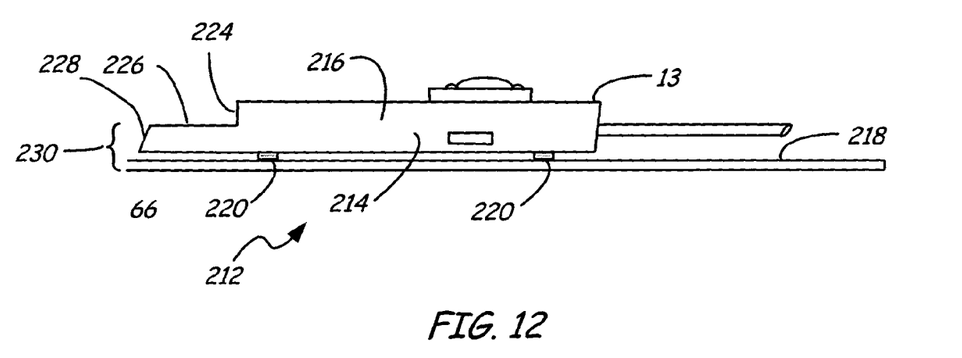
FIG. 12 is a side elevation view of the charging element of FIG. 11.

FIG. 12 illustrates a side elevation view of the charging element 212. Charging element 212 includes a housing 214 having a main portion 216. Charging element 212 is configured to be positioned on a generally flat support surface 218.

A plurality of pads 220 are illustratively attached to the housing 214 so that the pads 220 engage the support surface 218 when the charging element 212 is positioned on the support surface 218.

A ledge 222 extends from a face 224 on the main portion 216 of the charging element 212. The ledge has a top surface 226, which is illustratively generally flat and has a pair of electrical terminals (not shown) exposed thereon. The electrical terminals are attached a power source located within the housing 214, similar to the terminals 60 shown in FIG. 5. Ledge 222 has a front surface 228. The height 230 of the ledge 222 is defined as the distance 230 from the support surface 218 to the top surface 226 of the ledge 222. Charging element 212 can include any and all of the features described above with respect to charging element 12, including ports, terminals for engaging a mouse, even though are not illustrated in FIG. 12. In addition, a pair of magnets (not shown) can be located within the ledge 222.

Figure 13:
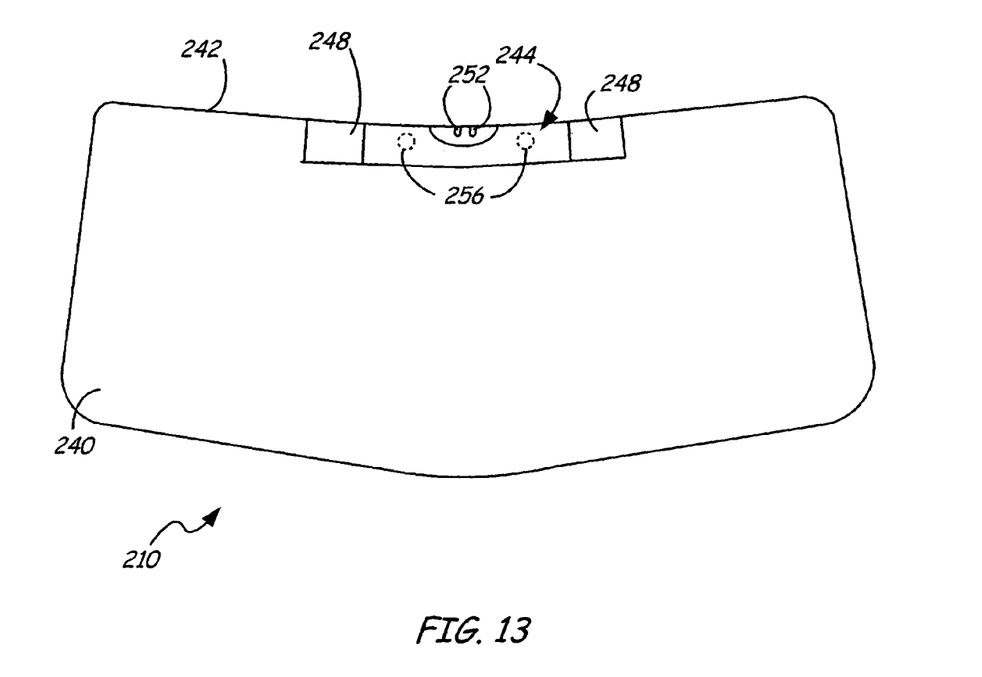
FIG. 13 is an illustration of the wireless keyboard of FIG. 11 showing an opposing surface to the one shown in FIG. 11.
Figure 14:
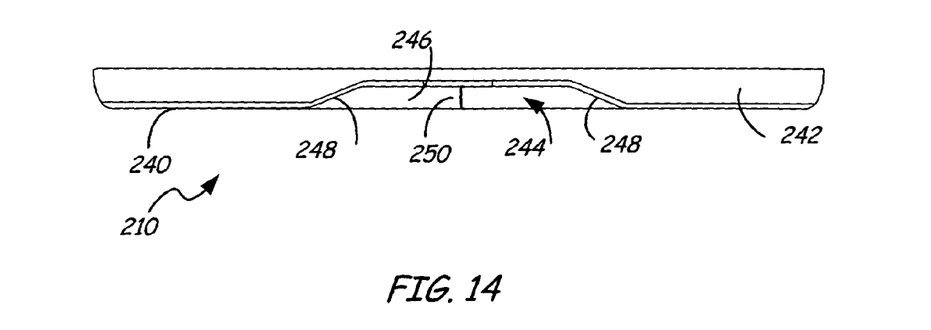
FIG. 14 is an elevation view of a front of the wireless keyboard of FIG. 11.

FIGS. 13 and 14 illustrate a bottom surface 240 and a front surface 242, respectively, of the wireless keyboard 210. The bottom surface 240 of the wireless keyboard 210 includes a depression 244 along a portion of the front surface 242. The depression 244 is sized and shaped to accept the ledge 222 of the charging element 212. Depression 244 extends from a back surface 246 to the front surface 242 of the keyboard 210. In one illustrative embodiment, the depression 244 has tapered sides 248 that provide an alignment function when the keyboard 210 is slid toward the charging element 212. The depression 244 has a height 250, which is approximately equal to the height 230 of ledge 222 in those portions of the depression that are inboard of the tapered sides 248. Thus, when the keyboard 210 is slid over the ledge 222, the shapes of the depression 244 and ledge 222 illustratively urge the keyboard 210 and charging element 212 into proper alignment.

A pair of terminals 252 is exposed on a portion of the bottom surface 240 of the wireless keyboard 210 that extends over the depression. When the keyboard 210 and charging element 212 are aligned, the terminals are illustratively aligned and in contract with terminals on the top surface 226 of the ledge 222. The charging element 212 can then provide an electrical charge to the wireless keyboard 210.

A pair of magnets 256 is illustratively positioned in a portion of the keyboard 210 that extends over the depression 244. The magnets 256 are positioned to engage the magnets in the ledge 222. In one illustrative embodiment, the magnets 256 are positioned either slightly inboard or outboard of the corresponding magnets in the ledge 222.

The illustrative embodiments above discuss the arrangement of a ledge and a depression on a charging element and a keyboard, respectively. Other arrangements can be used without departing from the scope of the discussion. For example, each of the charging element and wireless keyboard can include flush front faces with terminals positioned on the front faces. Alternatively, the keyboard can have a ledge that is configured to be engaged with a depression in a charging element. Alternatively still, the wireless keyboard can have a plurality of depressions, each of which is configured to engage a plurality of ledges on the charging element. In each case, the shape of the wireless keyboard and charging element are such that they can be engaged by a simple sliding of the keyboard along the supporting surface and toward the charging element.

The embodiments discussed above provide important advantages. A charging element is provided to charge a wireless keyboard. The charging element and wireless keyboard are connected to each other using a simple sliding motion as opposed to requiring a lifting movement. The shape of the charging element and wireless keyboard can illustratively provide visual cues to aid in alignment. In addition, magnets assist the user to properly align the keyboard without requiring fine positional adjustment as well as providing a retaining force to hold the keyboard and charging element in place. The charging element and wireless keyboard thus include an arrangement to provide fine alignment and a positive engagement, thereby providing an intuitive and easy to use charging system. In addition, the charging element is configured to accept a wireless mouse for charging. The charging element is capable of charging both the mouse and the keyboard simultaneously.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A charging device for charging a rechargeable power store, comprising:
   a housing having a main portion with a top surface and a bottom surface and a ledge extending from the main portion along one of the top and bottom surfaces;
   a power source provided within the housing; and
   a first pair of charging terminals positioned on the ledge and connected to the power source, for engaging terminals on a first wireless input device, wherein the top surface of the main portion of the housing remains free from engagement with the first wireless input device when the first pair of charging terminals are engaged with the terminals on the first wireless input device.

2. The charging device of claim 1 and further comprising:
   second and third pairs of terminals connected to the power source and positioned on the top surface of the housing to engage terminals on a second wireless input device.

3. The charging device of claim 2 and further comprising:
   a locating feature on the top surface of the housing positioned between the second and third pairs of terminals and configured to engage the second wireless input device.

4. The charging device of claim 1, wherein the charging device is configured to receive wireless communication signals from the first wireless input device.

5. The charging device of claim 1, wherein the charging device comprises:
   at least one magnet positioned in the ledge.

6. In combination with a wireless keyboard having a rechargeable power store, a first surface, an opposing second surface, and a pair of electrical terminals at a location on the first surface, a charging element configured to rest on a supporting surface, the charging element comprising:
   a housing having a main portion and a ledge having top and bottom surfaces cantilevered from the main portion between a first side and a second side of the housing;
   a power source provided within the housing;
   a pair of terminals coupled to the power source and positioned along a bottom surface of the ledge;
   wherein a distance between the bottom surface of the ledge and the support surface is about the same as a distance between the first surface and the second surface at the location of the terminals on the keyboard; and
   wherein a portion of the keyboard is positioned between the ledge and the support surface when the pair of terminals on the keyboard are in contact with the pair of terminals on the charging element and the charging element is positioned on a support surface.

7. The combination of claim 6, wherein the charging element comprises:
a first pair of magnets disposed within and spaced apart at a first distance along the ledge.

8. The combination of claim 7, wherein the keyboard comprises:
a second pair of magnets spaced apart at a second distance different from the first distance and positioned within the keyboard so that when the pair of terminals on the keyboard are in contact with the pair of terminals on the ledge, the second pair of magnets are attracted to the first pair of magnets.

9. The combination of claim 8, wherein the portion of the keyboard that is configured to be positioned between the ledge and the support surface has a width generally equal to a width of the charging element and a height lower than an adjacent portion of the keyboard.

10. The combination of claim 6, wherein the keyboard comprises:
a plurality of keys; and
a light source positioned behind at least one of the plurality of keys.

11. A method of charging a wireless input device having a pair of exposed terminals attached to a power store, comprising:
providing a charging element having opposing first and second major surfaces and a first pair of exposed terminals adjacent a front edge of the charging element disposed between the first and second major surfaces when the charging element is positioned on a generally flat support surface so that the exposed terminals of the wireless input device can be engaged with the exposed terminals on the charging element that is positioned on a support surface by moving the wireless input device toward the charging element along the support surface until the exposed terminals on the front edge of the charging element are engaged with the exposed terminals on the wireless input device.

12. The method of claim 11, wherein providing a charging element further comprises providing a charging element having an engagement feature on the first major surface capable of engaging a second wireless input device thereon.

13. The method of claim 12, wherein providing a charging element further includes providing a charging element having an engagement feature on the first major surface including second and third pairs of exposed terminals.

14. The method of claim 13 wherein providing a charging element further comprises providing a charging element having an engagement feature capable of engaging the second wireless input device so that exposed terminals on the second wireless input device are in contact with the second pair of exposed terminals.

15. The method of claim 14 wherein providing a charging element further comprises providing a charging element having an engagement feature capable of engaging the second wireless input device so that exposed terminals on the second wireless input device are in contact with the third pair of exposed terminals.

16. The method of claim 11, wherein providing a charging element having exposed terminals adjacent a front edge includes providing terminals that are oriented to face the support surface when the charging element is positioned on the support surface.

17. The method of claim 11, wherein the step of providing a charging element having exposed terminals adjacent a front edge includes providing terminals that are oriented to face in a direction generally normal to the support surface.

18. The method of claim 11, wherein providing a charging element includes providing a charging element that requires exerting a force on the wireless input device to urge the wireless input device to engage the charging element to maintain contact with the exposed terminals on the charging element.

19. The method of claim 11, wherein providing the charging element includes providing a charging element capable of receiving wireless signals from a wireless input device.

20. The charging device of claim 1 and further comprising:
a second pair of terminals connected to the power source and positioned on the top surface of the housing to engage terminals on a second wireless input device.

* * * * *